United States Patent
Zhu et al.

(10) Patent No.: US 9,226,037 B2
(45) Date of Patent: Dec. 29, 2015

(54) INFERENCE ENGINE FOR VIDEO ANALYTICS METADATA-BASED EVENT DETECTION AND FORENSIC SEARCH

(75) Inventors: Hongwei Zhu, Fresno, CA (US); Greg Millar, Coarsegold, CA (US); Farzin Aghdasi, Clovis, CA (US); Lei Wang, Clovis, CA (US); Shu Yang, Clovis, CA (US)

(73) Assignee: Pelco, Inc., Clovis, CA (US)

( * ) Notice: Subject to any disclaimer, the term of this patent is extended or adjusted under 35 U.S.C. 154(b) by 104 days.

(21) Appl. No.: 12/982,326

(22) Filed: Dec. 30, 2010

(65) Prior Publication Data

US 2012/0170902 A1    Jul. 5, 2012

(51) Int. Cl.
| | |
|---|---|
| *H04N 9/80* | (2006.01) |
| *H04N 21/482* | (2011.01) |
| *H04N 5/76* | (2006.01) |
| *G06K 9/00* | (2006.01) |
| *G06F 17/30* | (2006.01) |

(52) U.S. Cl.
CPC ........ *H04N 21/4828* (2013.01); *G06F 17/3079* (2013.01); *G06F 17/30817* (2013.01); *G06F 17/30828* (2013.01); *G06F 17/30834* (2013.01); *G06K 9/00771* (2013.01); *H04N 5/76* (2013.01)

(58) Field of Classification Search
USPC ....................................................... 386/242
See application file for complete search history.

(56) References Cited

U.S. PATENT DOCUMENTS

| | | | |
|---|---|---|---|
| 6,934,748 B1 * | 8/2005 | Louviere et al. ............. | 709/224 |
| 7,391,907 B1 | 6/2008 | Venetianer et al. | |
| 7,760,908 B2 | 7/2010 | Curtner et al. | |
| 2005/0008198 A1 | 1/2005 | Guo et al. | |
| 2006/0210110 A1 | 9/2006 | Hinkel | |
| 2007/0013776 A1 | 1/2007 | Venetianer | |
| 2007/0061696 A1 | 3/2007 | Vallone | |
| 2008/0074496 A1 | 3/2008 | Venetianer | |
| 2008/0184245 A1 | 7/2008 | St-Jean | |
| 2009/0087085 A1 | 4/2009 | Eaton et al. | |
| 2009/0192990 A1 | 7/2009 | Chin et al. | |

(Continued)

FOREIGN PATENT DOCUMENTS

| | | |
|---|---|---|
| WO | 2004 045215 A1 | 5/2004 |
| WO | 2008 008505 A2 | 1/2008 |

OTHER PUBLICATIONS

International Search Report and Written Opinion; PCT/US2011/066974; Sep. 14, 2012.

(Continued)

*Primary Examiner* — William C Vaughn, Jr.
*Assistant Examiner* — Daniel Tekle
(74) *Attorney, Agent, or Firm* — Hunter Clark PLLC

(57) ABSTRACT

Embodiments of the disclosure provide for systems and methods for searching video data for events and/or behaviors. An inference engine can be used to aide in the searching. In some embodiments, a user can specify various search criteria, for example, a video source(s), an event(s) or behavior(s) to search, and an action(s) to perform in the event of a successful search. The search can be performed by analyzing an object(s) found within scenes of the video data. An object can be identified by a number of attributes specified by the user. Once the search criteria has been received from the user, the video data can be received (or extracted from storage), the data analyzed for the specified events (or behaviors), and the specified action performed in the event a successful search occurs.

16 Claims, 13 Drawing Sheets

(56) References Cited

U.S. PATENT DOCUMENTS

| | | | |
|---|---|---|---|
| 2009/0276705 | A1 | 11/2009 | Ozdemir et al. |
| 2010/0166325 | A1 | 7/2010 | Sengamedu et al. |
| 2010/0177969 | A1 | 7/2010 | Huang et al. |
| 2010/0296742 | A1 | 11/2010 | Chandrasekaran et al. |
| 2011/0316697 | A1* | 12/2011 | Krahnstoever et al. ....... 340/540 |

OTHER PUBLICATIONS (Related Matter) International Search Report and Written Opinion; PCT/US2011/067732; Aug. 9, 2012.

International Preliminary Report on Patentability dated Jul. 2, 2013 for International Application No. PCT/US2011/066974, 4 pgs.

Wang, X., Ma, K. T., Ng, G. W., & Grimson, W. E. L. (2008). Trajectory analysis and semantic region modeling using a nonparametric Bayesian model. In 2008 IEEE Conference on Computer Vision and Pattern Recognition (pp. 1-8). Piscataway: IEEE. doi: 10.1109/CVPR.2008.4587718 Also available at: http://hdl.handle.net/1721.1/40808.

Khan, S., Javed, O., Rasheed, Z., & Shah, M. (2001). Human tracking in multiple cameras. In Computer Vision, 2001. ICCV 2001.

Nascimento, J., Figueiredo, M., & Marques, J. (2008). Independent increment processes for human motion recognition. Computer Vision and Image Understanding, 109(2), 126-138.

Supplementary European Search Report for EP2659433 and European Search Opinion dated Feb. 28, 2014.

* cited by examiner

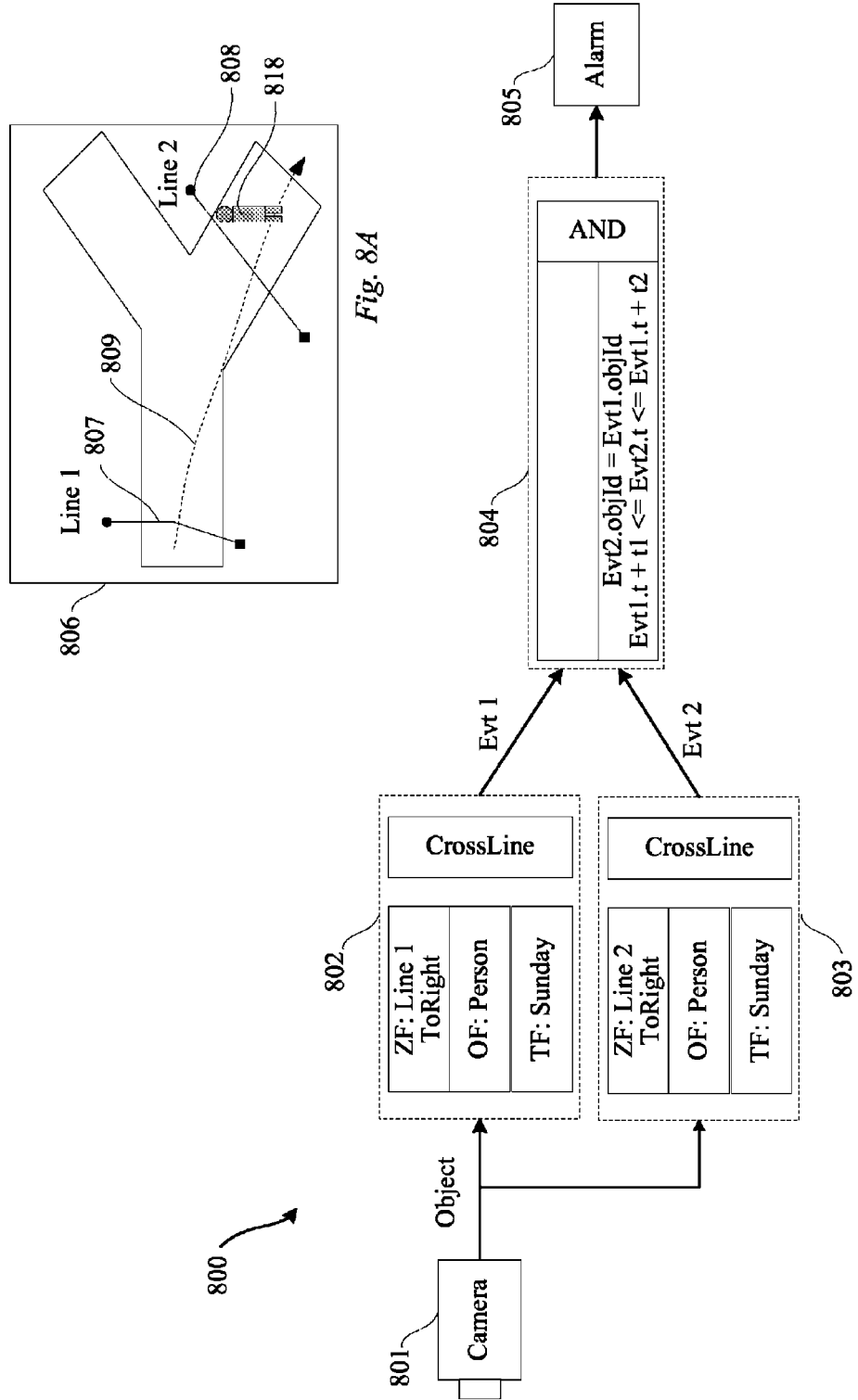

INFERENCE ENGINE FOR VIDEO ANALYTICS METADATA-BASED EVENT DETECTION AND FORENSIC SEARCH

BACKGROUND

Video is an important forensic information source; its processing can be resource-intensive in terms of high demand for computing power, data storage space, as well as sophisticated technologies. Every day there are huge amount of video data generated in the world due to a large population of cameras of different types (i.e., analog, digital, standard resolution, high definition resolution). Effectively and efficiently managing video data and extracting useful information is crucial in the information era. This can be especially true video surveillance applications.

Forensic search and data mining of video data are important for a broad range of applications. But the management of video data and the extraction of useful information is a challenging problem in both scientific and engineering domains. Various video processing systems have been proposed in the art for variety of video surveillance applications. However, such techniques are insufficient in terms of their effectiveness, extendibility and flexibility.

BRIEF SUMMARY

Embodiments of the disclosure provide for systems and methods for searching video data for events and/or behaviors. An inference engine can be used to aide in the searching. In some embodiments, a user can specify various search criteria, for example, a video source(s), an event(s) or behavior(s) to search, and an action(s) to perform in the event of a successful search. The search can be performed by analyzing an object(s) found within scenes of the video data. An object can be identified by a number of attributes specified by the user. Once the search criteria has been received from the user, the video data can be received (or extracted from storage), the data analyzed for the specified events (or behaviors), and the specified action performed in the event a successful search occurs.

In some embodiments, a method for use with an inference engine is disclosed. The method includes receiving video analytics metadata resulted from required video analytics engine that processes video of applications, receiving an inference engine file that specifies search criteria, combination logic, and expected actions upon inference rules are satisfied, applying inference rules to received video analytics metadata to find matches and derive events, taking expected actions on generated events.

In some embodiments, a method for representing inference engine using the inference engine description schema is disclosed. The method includes the steps of describing cameras with camera identifier, camera name, and regions of interest, describing inference rules with behavior rule, logic tree, and event descriptor.

In some embodiments, a method for representing a behavior rule is disclosed. The method includes specifying an object filter in terms of object features' conditions, specifying a time filter in terms of the time conditions of behavior occurrence, specifying a zone filter in terms of the spatial conditions of behavior occurrence, specifying an expected behavior in terms of one of supported individual behaviors.

In some embodiments, a method for representing a logic tree that includes representing a non-leaf node with one of three extended logic operators: "AND", "OR", or "NOT", representing a leaf node by a behavior identifier and an event modifier that specifies constraints on occurrence time, occurrence location, and triggering object between behavior events.

In some embodiments, a method for representing an event descriptor for common actions (e.g., log events to a file, raise alarms, send email notifications, display snapshots of event incidents, replay video clips of event incidents, etc), for event statistics reporting in term of minimum, maximum, average, standard variation, and counts of variant types is disclosed. The variant types can include: overall count, hourly count, week-daily count, daily count, weekly count, monthly count, and for event sorting through specifying a sorting measure consisting of a set of features and/or their influence weights.

In some embodiments, a method for configuring an inference engine in a similar manner as circuit schematic design through a graphic editor is disclosed. The method can include selecting and dragging required components from the component selection panel to the configuration panel that holds the design of the inference engine, editing components' inputs, outputs, and their properties via popped-up dialogues, connecting inputs and outputs between components through connection lines, saving the design in XML format as an inference engine file.

In some embodiments, a method for detecting events through a hierarchical pyramid structure is disclosed. The method includes indexing objects that have a same identifier as a track and updating a track upon its new object is received, detecting individual behavior events according to involved behavior rules based on tracks, sending behavior events to relevant leaf nodes of the inference engine's logic tree to evaluate the entire tree logic from bottom up, triggering expected actions upon a logic tree is evaluated a "TRUE" result on its root node that indicates an event is generated according to the logic contained in the logic tree.

In some embodiments, a method of behavior detector is disclosed. The method includes filtering an object by applying a preset object filter to the object's features that may consist of size (width, height, and number of motion pixels of the object), aspect ratio, shape (perimeter, compactness, etc.), speed, moving direction, object type, object status, appearance characteristics (color information), etc, filtering an object by applying a preset time filter that can be represented as a mixture of a duration form and a weekly calendar form to the object's occurring time, filtering an object by applying a preset zone filter (a line zone or a polygon zone) to the object's location, checking whether the track of an object passes through an expected behavior filter that may be any of the following: "Cross Line", "Enter Zone", "Leave Zone", "Appear", "Disappear", "Loitering", "Erratic Motion", "Object Merge", "Object Split", "Dwelling Object", "Direction Violation", "Abandoned/Removed Object", "Stopped Object From Afar", "Event Filter".

In some embodiments, methods for combining behavior events via a logic tree is provided. The method includes filtering behavior event at each leaf node of the tree according to its event modifier regarding occurrence time, occurrence location, and triggering object against reference behavior events, carrying out extended logic operations of "AND", "OR", and "NOT" that take in account the event filters' constraints, generating a combined/compound event upon the conditions in all involved modifiers are met and the extended logic operations are satisfied.

In some embodiments, a method for detecting NOT-Happen events is disclosed. The NOT-happen event can be based on a time count that accumulates the occurrence time of an expect behavior over a preset time period, where the monitored time period can be relative to the incidents of other reference behaviors.

One some embodiments a method for generating actions by inference engine on resultant events according to users' specifications is provided. The method can occur through inference rule's event descriptions comprising: logging events to a file, raising alarms, sending email notifications, displaying snapshots of event incidents, replaying video clips of event incidents, extracting statistics of events, in term of minimum, maximum, average, standard variation, and counts of variant types: overall count, hourly count, week-daily count, daily count, weekly count, monthly count, reporting obtained statistics information through text message, bar chart or histogram map, sorting events by evaluating resultant events against user specified sorting measure to enable that the events can be treated differently when they are monitored.

In some embodiments, a systematic framework for inference engine representation, configuration, and implementation is provided. The objective can be for video analytics metadata based event detection and forensic search that involve multiple cameras, in an effective, modular, flexible, scalable and extendable manner. With innovative extensions made in developing logic operators on behavior events by introducing cross-checking from constraints on triggering object, on event occurrence time, on event occurrence location, and expanding the "NOT" logic, events and queries that are both complicated and previously impossible using traditional logic can be easily detected.

To use this system, it assumes that the video analytics metadata have been already obtained, in terms of objects and/or basic events, from video analytics algorithms and represented in appropriate metadata form. Content of video analytics metadata could vary depending on algorithms, and they would include any subject of interest involved in video mining, retrieval, and forensic search, including moving objects, object derived prior events (basic events), vehicle license plate number, and human faces, etc.

A forensic video method is provided that includes receiving an indication from a user specifying a video source that specifies video data associated with a camera of interest. An indication is received from the user specifying a behavior to detect within the video data. An indication is also received from the user specifying an action to undertake in the event the behavior is detected. Video data associated with the camera of interest is received an analyzed for the specified behavior. In the event the specific behavior is found, the action specified is performed.

An inference engine is also provided that includes a video input, a user interface and a processor. The processor is communicatively coupled to the video source and the user interface. The video input is configured to input video data. And the processor is configured to: receive an indication from a user through the user interface specifying a video source, wherein the video source specifies video data associated with a camera of interest; receive an indication from the user through the user interface specifying an event to detect within the video data; receive an indication from the user through the user interface specifying an action to undertake in the event the event is detected; receive the video data associated with the camera of interest through the video input; analyze the video data for the specified event; and
in the event the specific event is found, perform the action specified.

A non-transitory computer readable medium is also disclosed that includes code executable by a processor. The code can cause the processor to receive an indication from a user through the user interface specifying a video source that specifies video data associated with a camera of interest. An indication is received from the user through the user interface specifying an event to detect within the video data. Another indication is received from the user through the user interface specifying an action to undertake in the event the event is detected. The video data associated with the camera of interest is received through the video input. And the video data is analyzed for the specified event. In the event the specific event is found, perform the action specified.

A method for searching video data for events is provided. The method includes: receiving an indication from a user specifying attributes of an object of interest; identifying objects with the specified attributes within a plurality of video frames; identifying a track associated with the object of interest, wherein the track includes data showing the relative motion of the object over time through the plurality of video frames; and determining whether the track's path matches a pattern of behavior.

A non-transitory computer readable medium is also disclosed that includes code that is executable by a processor. The code can cause the processor to: receive object attributes and an event; identify an object found within a plurality of video frames based on the object attributes; identify a track associated with the object, wherein the track includes data showing the relative motion of the object over time through the plurality of video frames; and determine whether the track's path matches the event.

In some embodiments, the behavior(s) can be a behavior associated with an image of an object found within the video data. For example, a behavior can include: the object crosses a line within the video scene, the object loitering, the object entering a zone, the object leaving a zone, the object appearing in a zone, the object disappearing from within a zone, the object dwelling in a zone, the object becoming abandoned, the object being removed from the scene or zone, the object speeding through the video data frames, the object violating direction parameters, a camera scene change, a camera sabotage, the video data stream becoming disconnected, the object merging with another object, and/or an object splitting from another object. In some embodiments, the behavior is a negative behavior or the non-occurrence of an event.

In some embodiments, the action can include logging behaviors to a file, raising an alarm, sending an electronic notification, displaying a snapshot of event incidents, replaying a video clip of event incidents, extracting statistics, sorting events, and switching between cameras on a display. In some embodiments, an indication from the user can be received that specifies an object type. In response the video data can be analyzed for the specified behaviors occurring in association with the specified object type. In some embodiments, an indication from the user can be received that specifies a time or a time range. In response the video data can be analyzed for the specified behaviors occurring at the specified time or within the specified time range.

In some embodiments, a specific zone within a camera field of view can be selected within which to search for the specified behavior. A zone can be defined by a line segment, multiple line segments, or a region of interest bounded by a polygon.

Items and/or techniques described herein may provide one or more of the following capabilities, as well as other capabilities not mentioned. For example, using embodiments described herein, video data can be produced in real time with metadata that includes information about objects and events captured in the video data. Moreover, video data can be analyzed and metadata created based on previously recorded video data. Furthermore, according to some embodiments, users can search the metadata based on characteristics of objects and/or events documented in metadata to find the desired video data. Various other capabilities may also be provided. While item/technique-effect pairs have been described, it may be possible for a noted effect to be achieved by means other than those noted, and a noted item/technique may not necessarily yield the noted effect.

BRIEF DESCRIPTION OF THE DRAWINGS

FIG. 8A is a block diagram of an event and FIG. 8B is an inference engine representation for detecting the occurrence of the event shown in FIG. 8A according to some embodiments.

DETAILED DESCRIPTION

Techniques are described herein for using an inference engine to perform forensic video searches. A user interface is also provided that allows user to visually represent a search criteria on specific video data to return a desired result. In particular, a variety of different types of events can be searched. Some of these events may be associated with an object found within a video scene. Other events may not. Moreover, multiple events associated with one or more object can also be searched and logically combined to produce a binary result. Techniques are also described for performing a function in the event search criteria are satisfied.

Figure 1A:
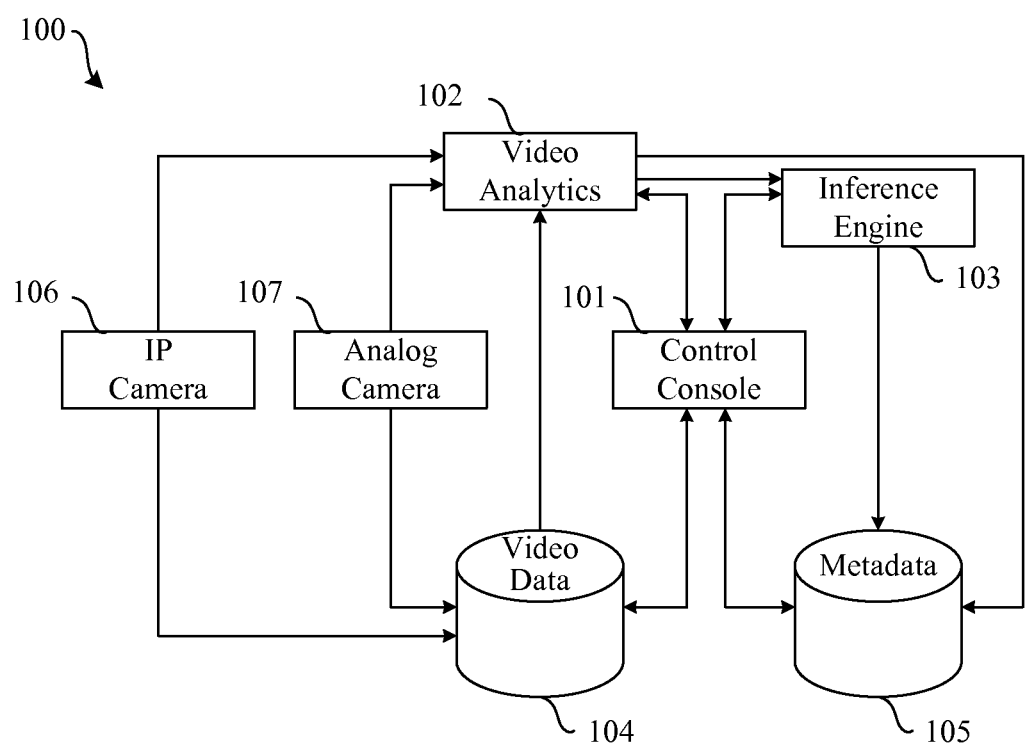
FIG. 1A is a block diagram of a video processing system.

FIG. 1A is a block diagram of video processing system 100 that can be used to perform various processes described herein. For example, video processing system 100 can process video analytics metadata based queries. As another example, video processing system 100 can process event generation processes. As yet another example, video processing system can process forensic searching and/or video mining. Video processing system 100 includes control console 101, video analytics (video analysis algorithms) 102, infer-ence engine 103, video data server 104, video analytics metadata server 105, and video source input (e.g., IP camera 106, analog camera 107, etc.).

Figure 1B:
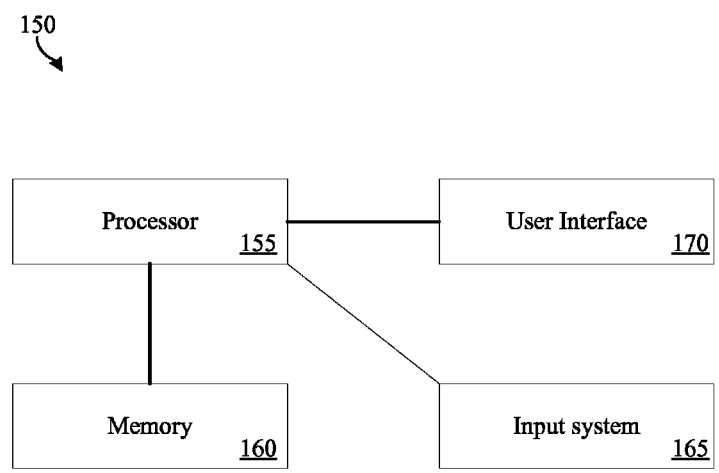
FIG. 1B is a functional block diagram of a processing unit.

Control console 101 is the control and management center of the video processing system and can provide a number of applications with various functionalities. A block diagram of computer system that can be used for control console 101 is shown in FIG. 1B. For example, control console 101 can include: analytics user interface (AUI) for video analytics 102, query user interface (QUI) for inference engine 103, and/or video management (video stream control, storage, and display, video analytics metadata storage control, visual event reporting and alarm handling, etc.) to name a few. Incoming video streams (from cameras 106 or 107, from video data server 104, DVRs, or other video players) can be processed by video analytics 102 to produce video metadata. Video metadata can be further fed into inference engine for detecting events of interest and executing actions according to query criteria described by inference rules from the query user interface (QUI) in control console 101. Both metadata from video analytics 102 and events from inference engine 103 can be logged into metadata server 105 for further use of forensic search.

The various components shown in FIG. 1A can be implemented in number of ways. For example, the components can be implemented in a centralized or distributed manner. For example, video analytics 102 can be embedded in edge devices, in cameras, or reside within the same platform as control console 101. As another example, inference engine 103 can be plugged into an edge device or reside within a central platform with control console 101. Either way inference engine can have access to video metadata derived from one or more video streams.

While an analog camera 106 and an IP camera 107 are shown any type of video source can be used. For example, a video source can be an edge device (smart camera or intelligent video encoder) with video analytics embedded. As another example, video source can be a video analytic application residing in a server for processing stored video. Regardless, a video source can provide video data and metadata.

Referring to FIG. 1B, computer system 150 includes a processor 155, memory 160, user interface 170, and video capture or input system 165. Computer system 150 can be used to implement various components in FIG. 1A. For example, control console 101, video analytics 102, and/or inference engine 103 can include the components of computer system 150 either as a singly system or as individual systems. Processor 155 is a programmable device, e.g., a central processing unit (CPU), such as those made by Intel® Corporation or AMD®, a microcontroller, an application specific integrated circuit (ASIC), a field-programmable gate array (FPGA), etc. Processor 155 can processes information received from input system 165. Input system can include IP camera 160, analog camera 170, and/or video data server 104. Memory 160 includes random access memory (RAM), read-only memory (ROM), and/or a hard drive. Memory 160 can include video data server 104 and/or metadata server 105. Memory 160 can store a non-transitory computer program product comprising processor-readable, processor-executable software code containing instructions that are configured to, when executed, cause the processor 155 to perform various functions or processes described herein (e.g., any of processes described in FIG. 6A, 6B, 7, 8B, 9B, 10B, 11B, or 12). Alternatively, the software may not be directly executable by processor 155 but configured to cause processor 155, e.g., when the instructions are compiled and executed, to perform any of the functions described. User interface 170 can include a display and input devices such as a mouse and a keyboard.

Figure 6A:
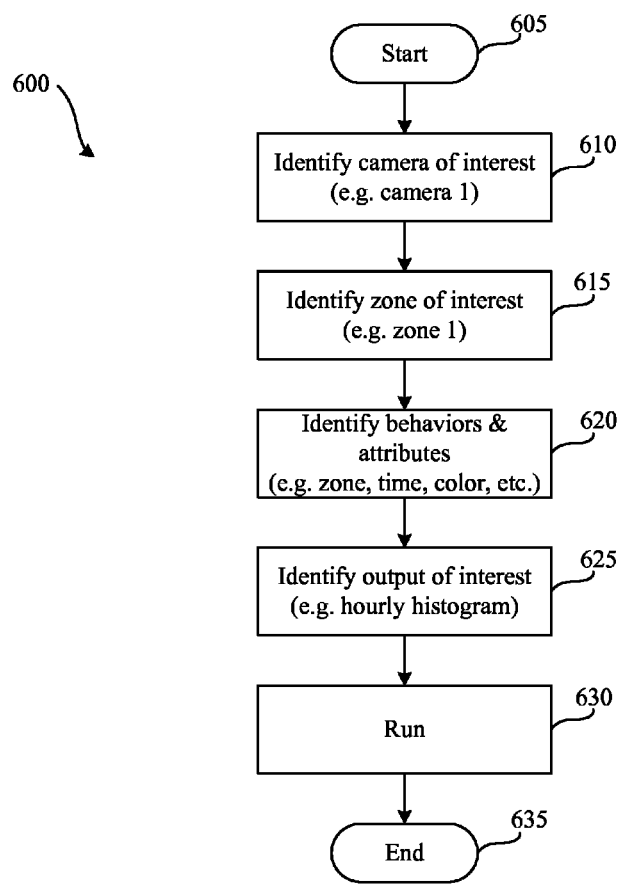
FIG. 6A is a flowchart for performing a forensic video search according to some embodiments.

Moreover, user interface can be used by a user to enter various parameters (e.g., the parameters discussed in relation to FIG. 6A).

Embodiments described herein can use video metadata for performing various processes. Video metadata can include information about objects viewed within a video scene and/or events that occur within the video scene. Video metadata can include features of moving objects (e.g., object type and/or object color(s)), basic events, the time and data of an object being viewed within a scene, object speed, vehicle license plate numbers, human features, etc. Any type of metadata can be used for the embodiments described herein.

As used herein, an object is a representation of a physical subject of various types (e.g., human, automobile, airplane, etc.) that appears in a video frame captured at a specific time. An object may be in motion and its relative position can change from one video frame to another. An object track is a summary of the same physical subject as it moves through video frames over time. Thus, the track can include a path of the object's locations over time.

An object can be represented with a number of attributes. For example, these attributes can include: object identifier (e.g., its belonging track's id), time stamp of the captured image frame where the object is detected, object locations, object size (e.g., width, height, and number of motion pixels), object aspect ratio, object shape (perimeter, compactness, etc), object velocity (both speed and direction, assuming a calibration is done already in video analytics), object type (e.g., Person, Car, Truck, Unknown), object appearance characteristics (e.g., color information), object status (e.g., Normal, Merged, Split, Still, Disappeared), etc. Various other attributes can also be used.

An event is an incident of an identified status as specified by an inference rule. In some embodiments, an event is associated with an object. An event can be specific to an area of interest (or zone) in the field of view (FOV) of a video stream or a field of view across multiple video streams. A region of interest (or zone) can be represented in several forms: e.g., by a series of line segments, by a region enclosed by a polygon, or by a mask image. When no zone is specified for event detection, by default the entire field of view serves as a special zone (e.g., zone0).

There can be two types of events depending on whether they are related to objects or not: object related events and object unrelated events. Examples of object related events include, but are not limited to: an object crossing a line, an object loitering, an object entering a zone, an object leaving a zone, an object appearing in a zone, an object disappearing from within a zone, an object dwelling in a zone, an abandoned object, a removed object, a speeding object, a direction violated object, an object merging with another object, an object splitting from another object, etc.

Object unrelated events are events that do not necessarily involve objects. These events can be treated as global events. These events can reveal overall statuses of FOV in a video stream, for example, these events can include such things as camera scene change, camera sabotage, video stream disconnected, etc.

According to some embodiments, an inference engine can receive both objects and events as metadata inputs. With object metadata input only, an inference engine can detect object oriented events; with event only metadata, an inference engine can process incoming events; with both object and event metadata inputs, inference engine can detect new mixed events involving both objects and events.

An inference engine can operate given two types of information: video data and at least one inference rule. In some embodiments, the video data can be provided by any video source that provides video metadata. An inference rule specifies the behavior in the video data to be identified, how the video data should be applied to generate an intended event, and/or what actions are to be triggered when an event is identified.

An inference engine may be implemented in a number of different ways. These can include software or hardware. For example, an inference engine can be in terms of plate text format, pure binary structure, or XML. For descriptive convenience, pseudo forms of XML are used throughout this disclosure examples only. Thus, for example, an XML inference can read as:

```
<InferenceEngine>
    a list of one or more cameras
    a list of inference rules
</InferenceEngine>
```

A camera (or video source) can have a number of attributes. These may include: camera id, camera name, camera URN (uniform resource name), camera type, etc. A zone is a region of interest identified within the field of view of one or more cameras. In some embodiments, a set of more than one zone can be identified, and each zone has a bunch of attributes: zone id, zone name, zone type (either polygon type or line type), and zone's location (a list of vertices) within the field of view of the camera.

Two type of zones can be used: a line zone and an area zone. A line zone can be an unbounded polygonal shape or a simple line between two vertices. A line zone can be used to detect if an object crosses the designated line segments in either or both directions. An area zone is an area within the field of view of the camera bounded by a polygonal shape with connecting lines between every two successive vertices. That forms the sides of the polygon (the connecting line between first and last vertices encloses the polygon shape). The region enclosed by the polygon shape is considered the zone. A polygon zone presents a region of interest in which object behaviors are of interest.

A zone filter can be used to filter the inference engine to search within a given zone(s). The zone filter can be specified as one of the inference rules. In addition, a default zone (zone0), defines the entire FOV, and it is used for detecting events related to entire FOV.

An example of IP camera representation in XML is given below. It includes two zones: zone 1 (a three-segment line zone) and zone 2 (a rectangle shape polygon zone):

```
<Camera id="1" URN="10.80.138.101" name="ParkingLot1>
    <Zone id="1" name="Entrance" type="Line" vertices="50 100 200
    100 200 200"/>
    <Zone id="2" name="Exit" type="Polygon" vertices="50 100 200
    100 200 200 50 200"/>
</Camera>
```

In some embodiments, an inference rule can be represented with three elements: behavior rule, logic tree, and event descriptor. An inference rule in XML, for example, can look something like:

```
<Rule id="rule ID value" name="rule name value ">
    a list of behavior rules
    a logic tree
    an event descriptor
</Rule>
```

A behavior rule is a representation of a behavior detector which intends to detect a specific behavior. There may be multiple behavior rules within a single inference rule, each formulating the detection of a specific behavior. A behavior rule can comprise following attributes: id, behavior name, camera id, and/or input data type (either object or specific event). A behavior rule can also have the following attributes: zone filter, object filter, and/or time filter. A behavior rule in XML, for example, can read as:

```
<Behavior id="behavior ID value" name="behavior name value"
camera="camera ID
    value" input="input type value">
    a zone filter
    an object filter
    a list of time filters
</Behavior>
```

Attribute "id" is the identifier of this behavior rule (also the identifier of its corresponding behavior detector) and that of its resultant behaviors during the inference process. The attribute "name" specifies which behavior filter is used by the behavior rule, and its value can take any of the following values: "Cross Line", "Enter Zone", "Leave Zone", "Appear", "Disappear", "Loitering", "Erratic Motion", "Object Merge", "Object Split", "Dwelling Object", "Direction Violation", "Abandoned/Removed Object", "Stopped Object From Afar", and or "Event Filter". Various other behavior values can be used. A camera attribute can indicate a predefined metadata source in the camera list session of the inference engine's representation, which provides metadata to the behavior detector. An attribute "input" can specify what metadata are exactly processed for behavior detection: either objects or specific events. If a behavior filter is not an "Event Filter", the attribute "input" can take "Objects" as an input. Otherwise the input can specify the name of an event, and all events bearing this event name will undergo a filtering process as is applied to their triggering objects.

A number of examples of individual behavior filters are described below. For example, a "Cross Line" filter detects when an object crosses a preset line zone in a preset direction. An "Enter Zone" filter detects when an object enters a preset polygonal shaped zone from outside the zone in a given or preset direction. A "Leave Zone" filter detects when an object leaves a preset polygon zone in a preset or given direction. An "Appear" filter detects when an object appears in a preset or given polygon zone, not necessary originally from its outside. A "Disappear" filter detects when an object disappears within a polygon zone. A "Loitering" filter detects when an object is within a preset polygon zone over a preset time. An "Erratic Motion" filter detects when an object moves within a preset polygon zone with erratic motion patterns. Erratic motion can include: swerving, a U turn, and periodic movement with a stop. An "Object Merge" filter detects when two or more objects merge together within a preset polygon zone. An "Object Split" filter detects when two or more objects that were previously merged split within a preset polygon zone. A "Dwelling Object" filter detects when an object stays still or wonders around a location over a preset time within a preset polygon zone. A "Direction Violation" filter detects when an object moves in a preset direction within a preset polygon zone. An "Abandoned/Removed Object" filter detects when an object keeps static over a preset time within a polygon zone. A "Stopped Object From Afar" filter detects when an object moves from a distant location and then stops and keeps static over a preset time within a polygon time. An "Event Filter" examines if an incoming event is the type of its watched event while applying preset object filter, zone filter, and time filter to the triggering object of the incoming event. In the above definitions of behavior filters, an entire FOV is assumed by default if there is no zone provided.

For example, a behavior rule for loitering detection based on camera 1's objects can be expressed as below where all detected behaviors have identifier 1.

<Behavior id="1" name="Loitering" camera="1" input="Objects"></Behavior>.

As another example, a behavior rule for filtering Event 2 from camera 1 may read as:

```
<Behavior id="2" name="Event Filter" camera="1" input="Event 2">
    an object filter
</Behavior>
``` where the input events with event name "Event 2" were generated before and they are to be processed by an object filter (as applied to their triggering objects), and only those passing through the object filter can be qualified for further processing in the inference engine.

A zone filter can include any of the following attributes: zoneID (indicating the identifier of a zone where the behavior is examined), directions, and dwell time. The "directions" attribute specifies the expected directions of object movement relative to the zone when the behavior is detected. Attribute "dwell time" specifies the least time that an object must reside within a polygon zone before it can be truly verified to trigger a preset behavior.

Directions are defined in different ways according to zone type. Directions for a polygon zone can be specified, for example, as: "To Right", "To TopRight", "To Top", "To TopLeft", "To Left", "To BottomLeft", "To Bottom", "To BottomRight", and "Any", and one polygon zone can have at most one of the above nine directions.

For each line zone's line segment (indicated by a start point and an end point), its zone direction is defined as the expected direction in which this line is crossed by an object's track (i.e., trajectory). The direction attribute of a line zone can be represented relative to the direction of the line segment (from its start point to end point): "To Left" (from the right side to the left side of the line segment), "To Right" (from the left side to the right side of the line segment), or "Any" (crossing the line segment in either direction). A line zone has as many zone directions as its constituent line segments.

It is not necessary to specify all the attributes for a zone filter. Any or all of them can be absent. In the case of an absent feature, it takes corresponding default values, zone 0 (entire FOV) for zoneID, direction "Any" for directions, and an internal default time threshold for dwell time.

An example zone filter in XML is given below for detecting the status of an object that stays in the zone 2 at least 5 seconds and moves to the top direction of FOV:

<ZoneFilter zoneID="2" directions="To Top" dwell-time="5 s"/>

With an object filter, a range of values may be specified for each of the following features by using a pair of minimum and maximum: object size (width, height, and number of motion pixels of the object), object aspect ratio, object shape (perimeter, compactness, etc.), object speed, and/or object appearance characteristics (color information). An expected value may be specified for other features, like direction, object type, and/or object status. It is optional to have either minimum or maximum for those features that can be filtered by a range. Having no minimum indicates there is no limitation of lower bound on the feature's value. Having no maximum indicates there is no limitation of upper bound. Any object feature not specified in an object filter is not taken into account during the filtering process.

An example of object filter representation in XML for detecting cars whose speed is over 15 mile per hour is given below:

```
<ObjectFilter>
    <Speed min="15mph" />
    <Type>Car </Type>
</ObjectFilter>
```

A time filter is actually a time schedule for specifying time range(s) during which a behavior is expected to detect. Three types of time schedules are supported: contiguous time duration (indicated by a start time and an end time), and weekly time schedule, or a mixture of the above two. An example of an XML time filter is presented below, which specifies the following time ranges: from 10:00 AM to 6:00 PM Monday through Friday, and from 8:00 PM to 11:00 PM on weekends during the period from 8:00 AM of January first to 8:00 PM of October first 2009.

```
<TimeFilter>
    <Duration start="2009-01-01T08:00:00" end="2009-10-01T20:00:00"/>
    <WeeklyTime start="10:00:00" end="18:00:00"> Mon Tue Wed Thu Fri
    </WeeklyTime>
    <WeeklyTime start="20:00:00" end="23:00:00">Sat Sun WeeklyTime>
</TimeFilter >
```

A logic tree is used to illustrate a logic representation to specify how to combine the outputs of involved behavior rules for obtaining an integrated event (compound event). Within a logic tree, each non-leaf node is denoted by one of three logic operators: "AND", "OR", and "NOT", and each leaf node is represented by an attribute: the id of a behavior rule and an optional event modifier.

The behavior id in a leaf node indicates that any event (behavior event) outputted from the behavior detector with this id is involved for logic operation and it is sent to a filtering process introduced by a modifier. A modifier specifies the conditions which a behavior must meet before it is qualified for logic combination. A modifier may include three optional constraints on the behavior's occurrence time, occurrence location, and triggering object. And these constraints can be imposed by other reference behaviors. A reference behavior is denoted by a reference behavior Id, and it is resulted from another behavior rule within the same inference rule.

Within a logic tree, a leaf tree node describes what behavior is of interest and how it is further filtered against constraints from reference behaviors before proceeding for logic combination. A non-leaf tree node simply indicates that a corresponding logic combination is applied to its children nodes' outputs. An example logic tree in XML is given below:

```
<Logic operator="AND">
<Behavior id="1"/>
<Behavior id="2">
    <Modifier>
        <Object referenceBehavior Id="1"/>
        <Time referenceBehavior Id="1" minDelay="-2s" maxDelay="5s"/>
        <Location referenceBehavior Id="1" minDistance="0 pixels"
        maxDistance="20 pixels"/>
    </Modifier>
</Behavior>
</Logic>
```

The above logic tree detects a compound event meeting the following conditions: an object triggers behavior detector 2 (to obtain behavior 2) during the time period from 2 seconds before to 5 seconds after the same object triggers behavior detector 1 (to obtain behavior 1), and behavior 2's triggering object is at most 20 pixels away from behavior 1's triggering object.

In the above example, component "Object" states that behavior 2's triggering object must be the same as that of behavior 1; component "Time" states that behavior 2 must occur in the range from time t−2 second to t+5 second where t is the time of behavior 1 occurs; component "Location" states that the distance between behavior 2's triggering object and behavior 1's triggering object must be in the range from 0 to 20 pixels, i.e., their distance would be less than 20 pixels.

An example of using "NOT" operator is given below:

```
<Logic operator="AND">
<Behavior id="1"/>
<Logic operator="NOT">
<Behavior id="2">
    <Modifier>
        <Object referenceBehavior ="1"/>
        <Time referenceBehavior ="1" minDelay="-2s" maxDelay="5s"/>
    <Modifier>
    </Behavior>
    </Logic>
</Logic>
``` which presents a logic for detecting a compound event meeting the condition: an object does not triggers behavior detector 2 during the time period from 2 seconds before to 5 seconds after the same object triggers behavior detector 1.

An event descriptor can specify what responses of actions are expected upon an event incident resulted from a logic tree or from a behavior detector. Within the expression of an event descriptor, a list of actions is specified, each denoting a dedicated action to be carried out. Common responses to an event incident can include, but not limited to: log the event to a file, raise an alarm (e.g., an audible alarm or a visual alarm), send an electronic notification (e.g., email or text message), display the snapshot of the event incident, replay video clips of event incident, etc. Two other specific actions are important for forensic search and video mining, and they are: statistics reporting and event sorting.

To describe statistics extraction, event features in terms of its triggering object, and statistic operators can be specified. The features can be any of those included in object features, and the statistic operators can calculate the following quantities: minimum, maximum, average, standard variation, and counts of variant types: overall count, hourly count (counting events for each of 24 hours), week-daily count (counting events for each of 7 days within a week), daily count (counting events for each day within a month), weekly count (counting events for each of 52 weeks within a year), monthly count (counting events for each of 12 months within a year). Various other statistical measures or calculations can be performed.

An XML example representation of a statistics extraction action is presented below, which is intended to calculate the event's overall count, hourly count, week-daily count, and minimum and maximum of height, width, aspect ratio and speed of the triggering objects of the detected events:

```
<ExtractStatistics>
    <Count>Overall Hourly Week-daily </Count>
    <Min>Width Height AspectRatio Speed </Min>
    <Max>Width Height AspectRatio Speed </Max>
</ExtractStatistics>
```

A sorting descriptor can also be used. This descriptor can be specified within an event descriptor, to illustrate what features are involved and how much influence each feature has in calculating a sorting measure. A sorting measure serves as a confidence value that is defined as a weighted summation of normalized similarities with each similarity calculated by evaluating the value of an involved feature against its reference value. Reference values can be obtained by referring to an object, or directly assigned with expected values. When reference values are derived from a reference object, event sorting is equivalent to sorting events according to the similarity between their triggering objects and the reference object.

An XML example of a sorting descriptor is given below, which states that the sorting confidence value is calculated using object type (with weight 0.4) and color information (with weight 0.6) against their reference values: Person and Red respectively:

```
SortingDescriptor>
    <Type weight="0.4", reference="Person"/>
    <Color weight="0.6", reference="Red"/>
</SortingDescriptor>
```

Figure 2:
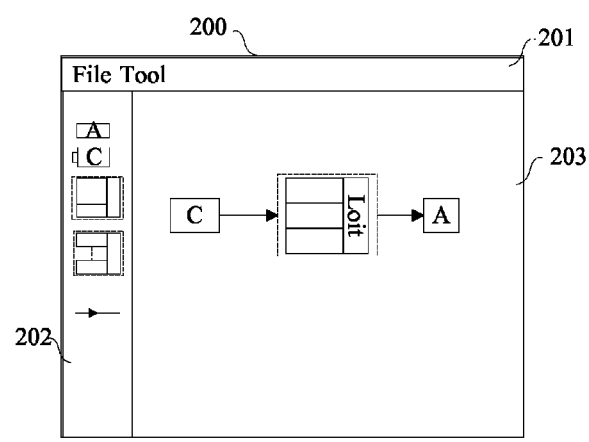
FIG. 2 is a screen shot of an inference engine graphic editor (IEGE).

Configuring an inference engine is the first step in video analytics metadata based forensic search, and a graphic user interface (GUI) can be used. An inference engine graphic editor (IEGE) can be used as a GUI to create a visual inference engine. Referring to FIG. 2, inference engine editor 200 includes three parts: function menu panel 201, component selection panel 202, and configuration panel 203.

Within menu panel 201, IEGE has two menus: "File" and "Tool". Under menu File, there is a list of submenus: "New", "Open", "Close", "Save", "Save as", "Print". Under menu Tool, there are two submenus: "Convert to Engine XML File", "Get from Engine XML File", providing conversions between graphic format and XML format of an inference engine.

Component selection panel 202 can hold all building components required for constructing a visual inference engine, including icons representing: Cameras, Behavior Detectors, logic operators, Activators, Connection Lines, etc. A component camera icon can represent the source of metadata including: objects that were resulted from video analytics applied to a video stream and events that were derived by other inference engines. Activators may include: "Event Storage", "Email Notification", "Alarm", "Statistics Generator", "Event Sorting", "Display Switch", etc.

The component camera icon can have a visual output pin for visually outputting metadata. The component behavior detector icon includes an input pin and an output pin, and its input pin can be configured as receiving objects or specific events of metadata while its output pin sends out detected behaviors in terms of events. Component logic operator has four input pins and an output pin. Among the four input pins, one is used to receive events (termed as main events) that are to be involved in for logic operation, and the other three are connected to three optional event outputs that serve as references to support the filtering on the main events. Each activator may have at least one input pin for receiving events. Connection Line provides a directed wiring tool to connect components with a direction indicates the data flow from the output pin of one component to the input pin of another component.

Behavior detectors are used to configure behavior rules and logic operator is used to configure logic trees, and activators are used to configure event descriptors. To configure an inference engine, it needs only to drag required components from the component selection panel 202 into the configuration design panel 203, and configure and connect the components properly as required.

Figure 3:
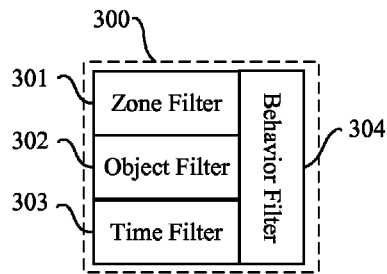
FIG. 3 is a block diagram of a behavior detector.
Figure 4:
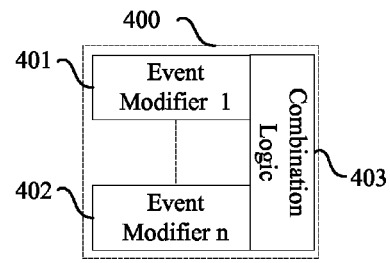
FIG. 4 is a block diagram of a logic operator.
Figure 5:
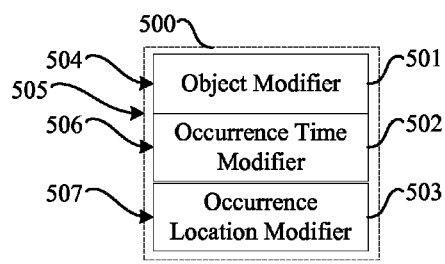
FIG. 5 is a block diagram of an event modifier.

FIG. 3 is a block diagram of behavior detector 300 with a zone filter 301, object filter 302, time filter 303, and behavior filter 304. This representation or a similar representation of the filters can be presented at the IEGE. FIG. 4 is a block diagram of logic operator 400 that includes a number of Event Modifiers 401 and 402 and one Combination Logic node 403. FIG. 5 is a block diagram of event modifier 500 that includes object modifier 501, occurrence time modifier 502, and occurrence location modifier 503. These three constituent modifiers have their own inputs 504, 506 and 507 respectively for receiving reference events. Main events can be input through input 505. Given a component a user can disable (e.g., through IEGE) any of the following units: zone filter, object filter, time filter, event modifier, object modifier, occurrence time modifier, and occurrence location modifier if none of its functionality is required by an inference engine.

Each functional unit has its own properties that correspond to its attributes and components described in the representation scheme of inference engine. This provides a straightforward mean to configure an inference engine, which can be done graphically through an interactive way by clicking and adjusting the values of properties for enabled function units through the IEGE. For example, the unit of zone filter has properties: zoneID, directions, and dwell time, which can be configured and modified through IEGE. The values of these properties can be specified as follows: right click a property of a selected Zone Filter unit and a dialog is popped up, then adjust its values and confirm the changes. For another example, through a selection from a list of supported behavior names Behavior Filter can be configured for the following behavior detection: "Cross Line", "Enter Zone", "Leave Zone", "Appear", "Disappear", "Loitering", "Erratic Motion", "Object Merge", "Object Split", "Dwelling Object", "Direction Violation", "Abandoned/Removed Object", "Stopped Object From Afar", "Event Filter", etc.

Figure 6B:
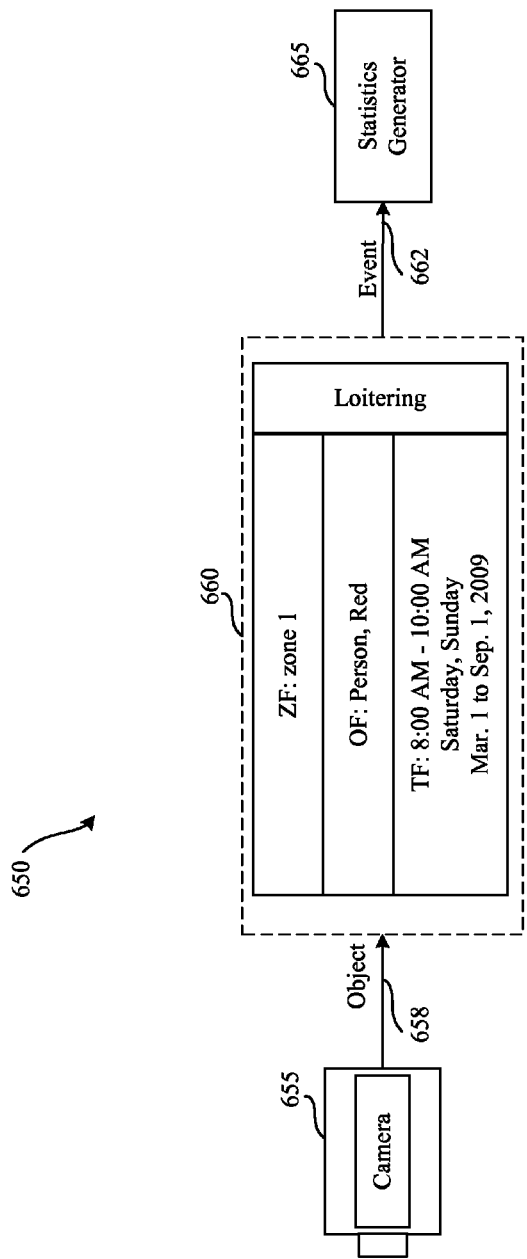
FIG. 6B is an inference engine for a loitering detection rule including statistic reporting according to some embodiments.

Referring to FIG. 6A, process 600 for performing a forensic video search includes the blocks shown. Referring to FIG. 6B, screen shot 650 of a configuration panel of an IEGE representing process 600 includes the components shown. The goal of process 600 is to find all people wearing red shirts (or other red clothing like sweaters, jackets, skirts, pants, coats, etc.) and loitering in zone 1 of camera 1 from 8:00 AM to 10:00 AM any weekend during the period from Mar. 1 to Sep. 1, 2009. An hourly histogram of occurrence can be produced.

Process 600 starts at block 605 and at block 610 a camera of interest can be identified. In systems with metadata that includes video information from multiple cameras, a single camera or multiple cameras can be identified for the inference engine to search. In this example camera 1 is identified by a user. For example, using an IEGE, an icon or other representation of camera 1 can be dragged from the component panel to the configuration panel. A generic camera icon is shown as block 655 in FIG. 6B. The camera icon's attributes can be set to specify the camera as camera 1 (e.g., by setting the camera id, camera URN, camera name, etc.). The attributes can be set by selecting a "Camera Setup" dialog box on the IEGE. This dialog box, for example, can be found by right clicking on camera icon 655.

At block 615 a zone of interest, for example, zone 1, can be identified. Using IEGE zone 1 can be graphically identified. For example, the boundaries of zone 1 can be identified by allowing the user to draw a box (or any other shape, for example, any a polygon, oval or circle) on a graphical representation of the field of view of camera 1. In particular, by drawing the boundaries of zone 1, IEGE can identify the pixels within the drawn boundary that are within zone 1. As another example, a user can enter the coordinates of the vertices of a polygon that identify the boundaries of zone 1 in a text entry field. In response IEGE can draw zone 1 within the field of view of camera 1. Moreover, a hybrid process can be utilized. For example, the user can draw the boundaries of zone 1 and IEGE can produce the coordinates of the vertices of the boundaries of zone 1 in a graphical window. The user can then adjust the boundaries of zone 1 by editing the coordinates. While a single zone is selected, multiple zones within a single camera filed of view or multiple camera field's of view can be identified in a similar manner.

At block 620 the behaviors of interest can be identified. These behaviors can include, but are not limited to, any of the various behavior described through this disclosure. Using IEGE behavior detector icon 660 can be dragged from the component panel to the configuration panel. A connection line 658 can connect the output of camera 1 icon 655 to the input of behavior detector icon 660 with the connection line direction pointing to detector icon 660. By connecting camera 1 icon 655 with behavior detector icon 660 IEGE establishes that the selected behaviors will be searched within the identified zone(s) (e.g., zone 1) of camera 1.

Specific behaviors can be identified, for example, by using a "Behavior Setup" dialog box on the IEGE. The metadata type can be selected as objects. Various other metadata types can be selected. The zone within which the specific behavior is to be searched can then be identified. Using the "Add Zone Filter" dialogue box within IEGE the zones identified in block 615 can be displayed. One or more zones can be selected within which to search for the specific object. In some embodiments, by default all previously identified zones can be selected.

A time filter can also be selected. Using a "Time Filter" dialogue box associated with Behavior Detector 660 the time frame can be identified. A user can chose "Add Time Filter" (e.g., from two options: "Add Time Filter" and "Edit Time Filter"). A time filter setup dialog is popped up with two schedules: a duration editor indicated by "Start Time" and "End Time", and a weekly calendar with 7 columns presenting 7 days within a week and 48 rows presenting daily 24 hours (with half-hour intervals). In this specific example, the duration can be set with "Start Time" set to Mar. 1, 2009 and with "End Time" set to Sep. 1, 2009. Mark those entries in the weekly calendar corresponding to from 8:00 AM to 10:00 AM on the two columns of Saturday and Sunday.

The attributes of the object can also be specified. Using IEGE an "Object Filter" dialog box associated with behavior detector 660 can be used to identify object attributes. An object filter setup dialog is popped up which lists a set of object attributes. In this specific example, the attribute of "Object Type" can be selected and set to "Person" from an object type list. The attribute of "Color" can be enabled and set to "RED" from a color option list. Various other attributes can be specified.

Behaviors of the object can also be identified. Using IEGE a "Behavior Filter" dialog box associated with Behavior Detector 660 can be used to identify behaviors of the object. For example, "Loitering" can be selected from a list of behaviors. Various other behaviors could be selected in addition to or instead of loitering.

The output can then be identified at block 625 of process 600. In this specific example, an hourly histogram of occurrences can be produced. For example, a Statistics Generator icon 665 in FIG. 6B (an activator) can be dragged from the configuration panel. The properties of the statistics can be set. In this specific example, "Hourly Count" can be chosen in the popped up dialogue for event descriptor configuration.

Within IEGE connection line 662 can link behavior detector icon 660 with input of statistics generator 665. With the input, the behaviors, and output identified, process 600 can be run at block 630. As specified, an hourly histogram of occurrences of the identified behaviors occurring within the identified zone of the identified camera can be produced. Process 600 can then end at block 635.

Figure 7:
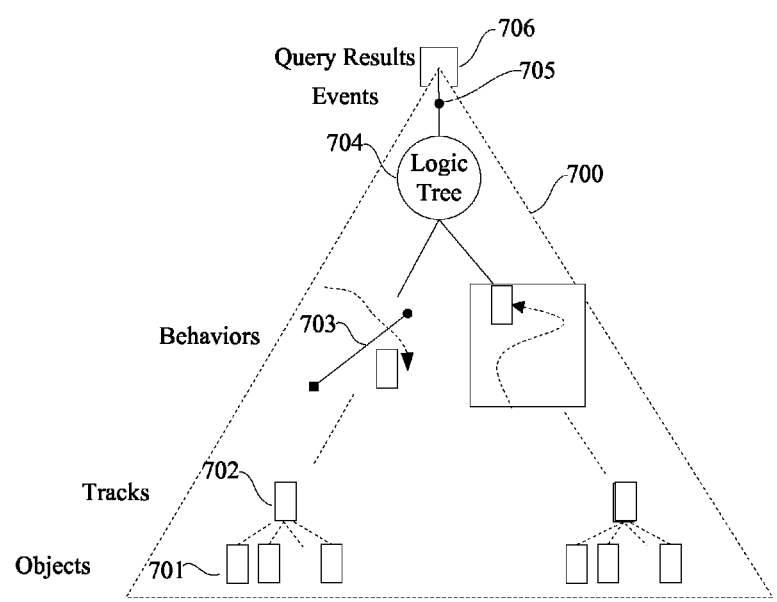
FIG. 7 is a data flow diagram of an inference process according to some embodiments.

The data flow of an inference process is shown in FIG. 7. The inference process follows pyramid structure 700 with objects 701 at the bottom level and query results 706 at the top level. Given an object identified in metadata, it can be indexed as track 702 via its object identification. The track can be updated every time a new object is found in metadata. Based on tracks, behaviors of interest 703 can be detected and then combined further through logic operations within logic tree 704 to obtain compound events 705 that further trigger certain actions and provide query solutions 706.

A track expires if its object has the status of "Disappeared" or it has not been updated by incoming objects for a period of time. Queries and event detections can be based on processing tracks, rather than processing objects. In some embodiments, the process of detecting a behavior (or event) using a behavior detector can include the following filtering processes. First, an object is indexed as a track and the track is examined via time filtering to check if its current time falls into any of time schedules indicated by the time filter of the detector. Second, if the track passes the time filtering, it is further examined via zone filtering to check if the object is within the zone indicated by the zone filter of the detector. Thirdly, if the track is in the zone, it is further examined via behavior filtering to check if the track's path matches any of the expected patterns of the behavior indicated by the behavior filter of the detector. Finally, if the track passes through the behavior filtering (i.e., its path matches to the behavior patterns), it is further examined via object filtering to check if the object meets the object attributes indicated by the object filter of the detector. If the track passes the object filtering, it launches (i.e., triggers) an incident of the behavior. When a behavior detector is triggered by a track, a behavior event is generated on the detector's output, and it is stored and linked to its associated leaf notes of the logic tree. The behavior event keeps updated as long as the track continues to trigger the behavior detector (passing through the above four filtering processes) until it becomes invalid or its triggering track disappears.

Any number of behavior filters can be used in embodiments described herein. The following filters, for example, can be implemented: "Cross Line", "Enter Zone", "Leave Zone", "Appear", "Disappear", "Loitering", "Erratic Motion", "Object Merge", "Object Split", "Dwelling Object", "Direction Violation", "Abandoned/Removed Object", "Stopped Object From Afar", and "Event Filter". This list is not exhaustive. Any number or types of filters can be used.

A behavior event can include a number of attributes, including, but not limited to: behavior ID, behavior name, camera ID, zone filter ID, start object (launching this event), the object that matches best with the sorting measure (if the inference rule's event descriptor includes a sorting measure), and end object which is the last object before the event becomes invalid. With the above information, the IEGE can provide the following: a snapshot display for the start object, the best matched object, the end object; a video clip playback for the event's life span (from the time stamp of the start object to that of the end object); a statistical calculation for user specified features; statistics including the minimum, maximum, mean, count, and histograms (hourly, weekly, monthly, etc.); event sorting according to user specified sorting measures, etc.

For metadata based forensic search and event generation, a logic operator can extend the notions of traditional combination logic in four aspects: introducing constraints on triggering object id, on event occurrence time, on event occurrence location, and expanding the "NOT" logic.

Behavior events can be cross-validated to check if they are triggered by the same object This can be done, for example, by filtering tracks using an object modifier. This can be helpful, in some instances, when detecting sequential behaviors triggered by a same object over time. If no object modifier is specified in a logic operator representation, no constraints are imposed on triggering objects of behaviors for logic operations; therefore, it does not matter whether or not triggering objects are associated with a same physical subject. Through the location filtering by an occurrence location modifier, behavior events can be cross-validated to check if their triggering objects satisfy spatial relation according to specifications.

Traditional combination logic does not consider the effectiveness of an event over a time range. For example, a traditional "AND" combination logic results in "TRUE" only its inputs are all "TRUE" in the same time, and it results in "FALSE" otherwise. Such a restriction may be unsatisfactory for forensic search. For example, it would be difficult to detect any person leaving exit 2 within 5 minutes after entering entrance 1. In this case, the "AND" logic operation is applied to two events: "Enter Entrance 1" and "Leave Exit 2", but they never happen in the same time. To overcome the obstacle inherent in the traditional logic operations, a scheme is developed to make an event capable of lasting for required time (it is 5 minutes in this example), rather than becoming invalid immediately. With this extension of effectiveness in time domain, an event can be detected when a person enters entrance 1 and then leaves exit 2 3 minutes later.

Similarly, an extension is made for "NOT" operation on behavior events by taking into account effectiveness over a time period. For example, a query searching for a person waiting for at least time period t in front of a service desk while no serving person is there, the logic can be represented as below:

```
<Logic operator="AND">
  <Behavior id="1"/>
  <Logic operator="NOT">
    <Behaviour id="2">
    <Modifier>
      <Time referenceBehavior ="1" minDelay="–60s" maxDelay="0s"/>
    </Modifier>
```

```
    <Behavior>
  </Logic>
</Logic>
``` where two behavior detectors are involved with ids 1 and 2 respectively. Behavior detector 1 is a "Dwelling Object" detector that can detect a person dwelling for a preset time t in a waiting zone. Behavior detector 2 is an "Appear" detector to find a person appearing in the serving zone. To implement this logic, a count is used to accumulate the occurring time of the events resulted from detector 2 for the latest 60 second period. If detector 1 finds a person waiting too long (over time t) while the time count is zero, an event is generated.

In the example shown above, a positive time value can indicate a time instant after the occurring time of the reference event; and a negative time value can indicate a time instant before the occurring time of the reference event. With the support for both positive and negative time shifts, it is free to select reference events without having to follow the occurrence order of events (that is, it is not necessary to have a reference event occurring ahead of time). With this relaxation not only is flexibility provided but more complex events can be detected. This is especially useful in detecting a NOT-Happen event prior to a reference event, like in the above example. A NOT-Happen event is a special event that has not occurred in a preset time period.

An activator is used to react to the incidents of event output either from a logic operator or a behavior operator, and it can be implemented through an event monitor. The monitor comprises following display windows: event message window, event snapshot and event playback window, event histogram figure window, event statistics display window, color coded event log map.

A number of examples of event forensics are provided in FIGS. 8A, 8B, 9A, 9B, 10A, 10B, 11A, and 12.

A first example is shown in FIGS. 8A & 8B. As shown in FIG. 8A an inference engine detects when person 818 passes through a second line 808 (from left to right) within a time period from $t_1$ to $t_2$ after he or she first passes through first line 807 (from left to right) along path 809 on a Sunday. As shown in FIG. 8B event process 800 can be established to alarm a user when such an event occurs. In this example, camera 801 is selected by the user for video analysis.

Behavior detectors 802 and 803 can be used to define the behaviors of interest. Behavior detectors 802 is a "Cross Line" detector as indicated in the figure. The zone filter (ZF) is defined as an object crossing line 1 to the right with respect to the line zone that has the starting point indicated by dark solid square and the end point by dark solid circle. The object type of interest to behavior detector 802 is defined as "person" as shown in the object filter (OF). And the time filter (TF) is set to Sunday. Thus, behavior detectors 802 is set up to detect when a person crosses line 1 807 to the right on a Sunday. Similarly, behavior detector 803 is configured for detecting a person that passes through second line 808 on Sunday. The various filters are shown in the figure. Logic operator 804 is an "AND" operator that combines the two behavior events, Evt 1 from behavior detector 802 and Evt 2 from behavior detector 803 with conditions made in the event modifier of Evt 2. That is Evt 1.objId=Evt 2.objId ensuring that the two events must be triggered by the same object. And Evt 1.t+t1<=Evt 2.t<=Evt 1.t+t2 (here 0<t1<t2) guaranteeing that Evt 2 occurs in time range from t1 to t2 after Evt 1 occurs. The event modifier for Evt 1 is null, indicating no constraints are applied to it. In this example, Evt 1 provides the reference for Evt 2's conditions. Finally, an activator alarm 805 is connected to the output pin of logic operator 804 for raising an alarm when the compound event is found.

Figure 9A:
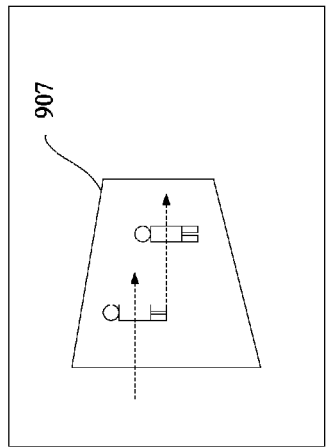
FIG. 9A is a block diagram of an event and FIG. 9B is an inference engine representation for detecting the occurrence of the event shown in FIG. 9A according to some embodiments.
Figure 9B:
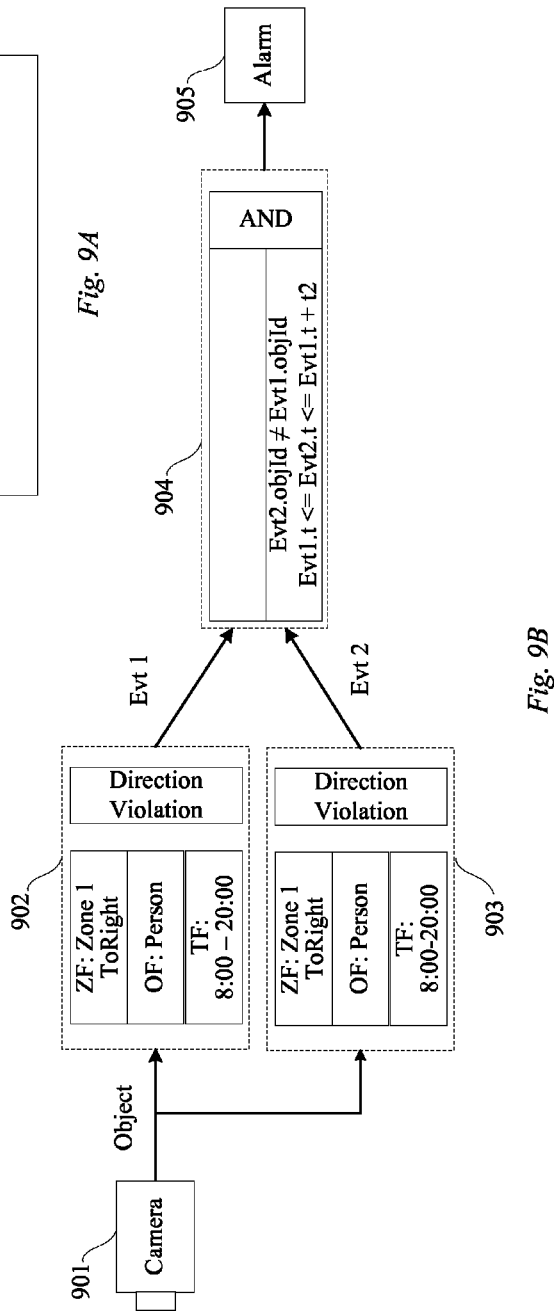

FIGS. 9A & 9B present another example. In this example, as shown in FIG. 9A, the inference engine detects people tailgating following very closely behind another person in a zone from 8:00-20:00 within a camera field of view 907. In this example, as shown in FIG. 9B, camera 901 is selected by the user for video analysis. Behavior detector 902 is configured to detect a direction violation event labeled as Evt 1. That is, behavior detector 902 detects a person moving to right within the zone from 8:00 to 20:00 as noted in the zone filter (ZF), object filter (OF), and the time filter (TF). Behavior detector 903 is configured to detect a second direction violation behavior labeled as Evt 2 in a manner similar to behavior detector 902. Logic operator 904 combines the two behavior events in an "AND" function. That is, Evt 1 and Evt 2 with conditions made in the event modifier of Evt 2. Evt 1.objId≠Evt 2.objId ensuring that the two events must be triggered by different objects, and Evt 1.t<=Evt 2.t<=Evt 1.t+t2 (here 0<t2) guaranteeing that Evt 2 occurs within time t2 after Evt 1 occurs. An activator alarm 905 is connected to the output pin of logic operator 904 that raises an alarm when the event occurs.

Figure 10A:
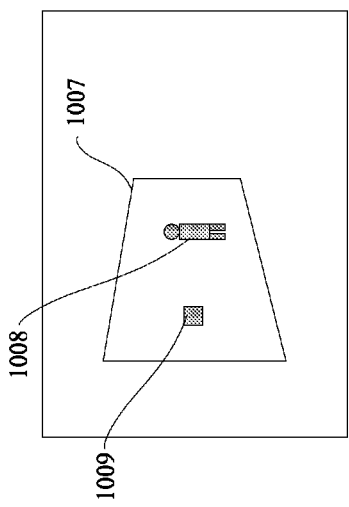
FIG. 10A is a block diagram of an event and FIG. 10B is an inference engine representation for detecting the occurrence of the event shown in FIG. 10A according to some embodiments.
Figure 10B:
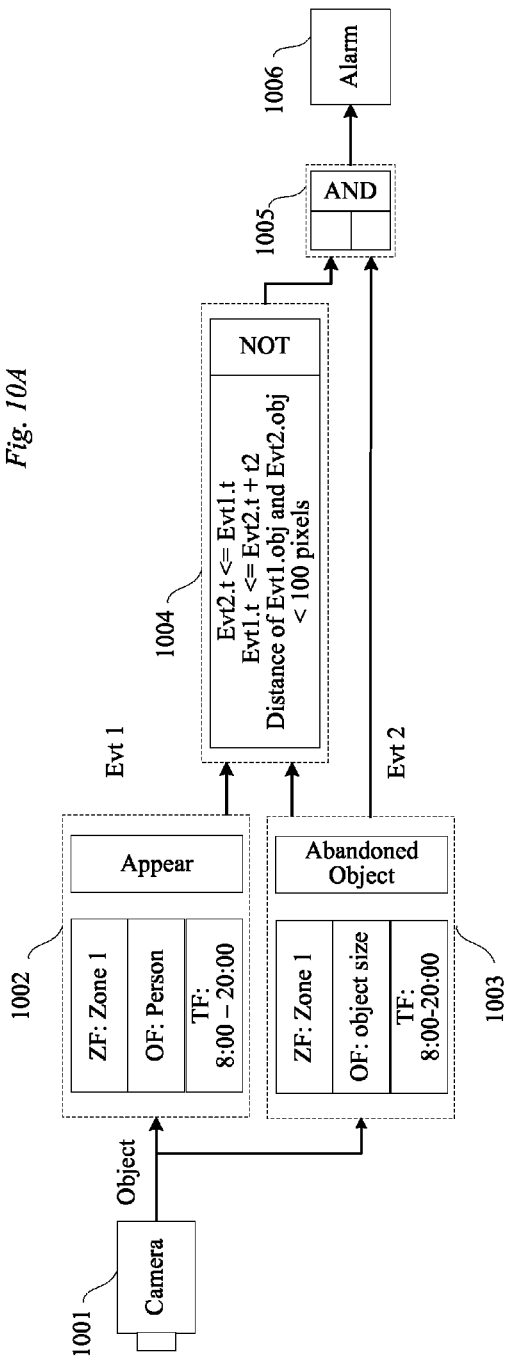

FIGS. 10A & 10B present another example. In this example, as shown in FIG. 10A, the inference engine raises an alarm when unattended bag 1009 is found in a monitored area of camera scene 1007 from 8:00 to 20:00. That is, when nothing happens for a period of time within the scene except the bag being abandoned. In this example, as shown in FIG. 10B, camera 1001 is selected by the user for video analysis. Two behavior detectors are used. Behavior detector 1002 detects people 1008 appearing in monitored zone 1007. Note the zone filter (ZF) identifies zone 1 10007, the object filter (OF) identifies a person, and the time filter (TF) the requested time. The "Appear" object filter creates an event when an identified object appears within the identified zone within the identified period of time. Behavior detector 1003 detects abandoned bag 1009 within zone 1 in the same time period. Both behavior detectors set their zone filters (ZF) to the same monitored area (zone 1) and use the same time filter (TF) (from 8:00 to 20:00). Their object filters (OF) are different: behavior detector 1002 sets object type to "Person" while behavior detector 1003 sets its object filer for an object with a small size by specifying it's min and max values of object width and object height. Behavior detector 1003 generates event Evt 1 and behavior detector 1002 generates event Evt 2. Evt 1 is further negated by logic operator 1004, which is NOT operator with event modifying on occurrence time (Evt 2.t<=Evt 1.t<=Evt 2.t+t2) and occurrence location (the distance between Evt 1s triggering person and Evt 2's triggering bag is less than 100 pixels) with respect to those of Evt 2 (which is also connected to event modifier 1004). As aforementioned, the "NOT" logic operator generates its output based on the time count of its filtered input events in a preset time range after an abandoned object is detected. If the count is 0, its output is "TRUE", otherwise "FALSE". An "AND" logic operator 1005 is used to combine the outputs from behavior detector 1003 and logic operator 1004 for a final event that triggers the Alarm activator 1006.

Figure 11A:
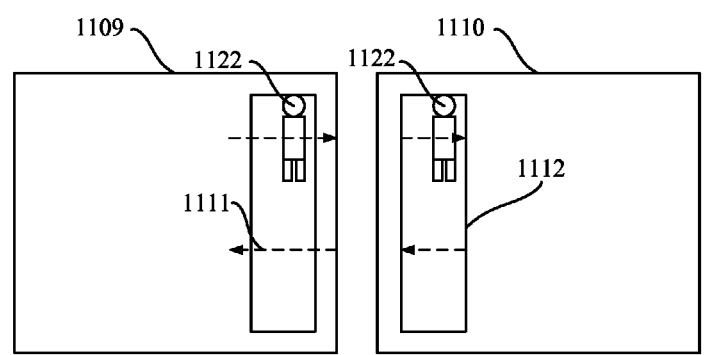
FIG. 11A is a block diagram of an event and FIG. 11B is an inference engine representation for detecting the occurrence of the event shown in FIG. 11A according to some embodiments.
Figure 11B:
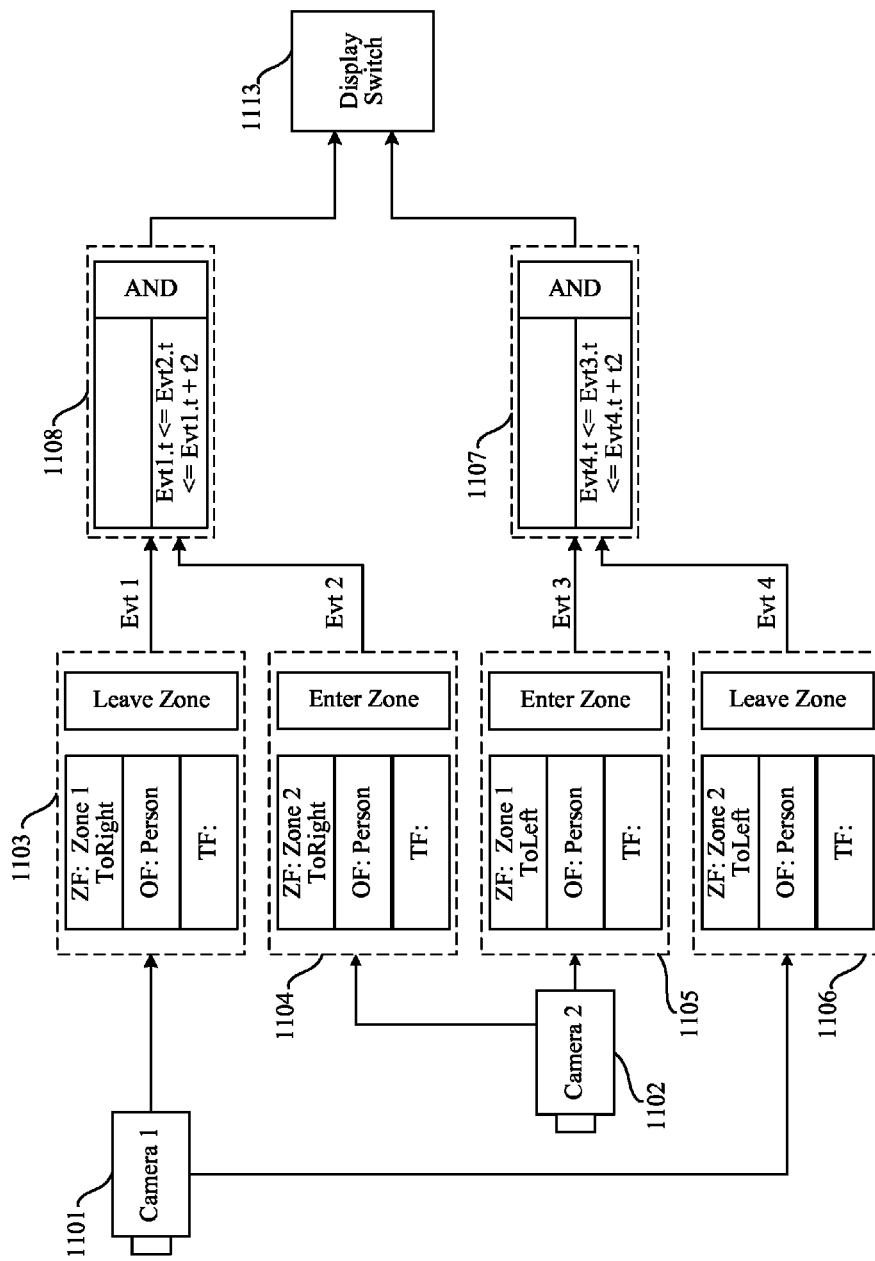

FIGS. 11A & 11B present another example. In this example, as shown in FIG. 11A, the inference engine switches from a first camera to a second camera when person 1122 leaves the field of view of camera 1 1109 and enters the filed of view of camera 2 1110. That is, a display follows a person as he or she moves from camera 1 to camera 2. In this example, it is assumed that two cameras are placed side by side with camera 1 on the left and camera 2 on the right, and they do not have overlap in their field of view. As shown in FIG. 11B, camera 1101 and camera 1102 are selected by the user.

Behavior detector 1103 is a leave zone detector and is used to detect when a person leaves the right side zone 1111 of camera 1 1109 in the right direction. The zone filter (ZF) is set to detect an object leaving zone 1 to the right and the object filter (OF) is set to detect a person. The time filter (TF) is not specified leaving the operation independent of time. Behavior detector 1104 is an enter zone detector that detects the behavior of a person entering the left side zone 1112 of camera 2 1102 in the right direction. The outputs of the two detectors are combined using logic operator 1108 with an "AND" operator that includes a time modification that ensures that event 1 occurs before event 2 (Evt 1.t<=Evt 2.t<=Evt 1.t+t2). The event output of 1108 indicates a person entering camera 2 from camera 1 and enables display switching from camera 1 to camera in activator 1113. Similarly, behavior detectors 1105 and 1106, and logic operator 1107 detect a person moving from camera 2 to camera 1 and the event incident of 1113 switches camera viewing from camera 2 to camera 1.

Figure 12:
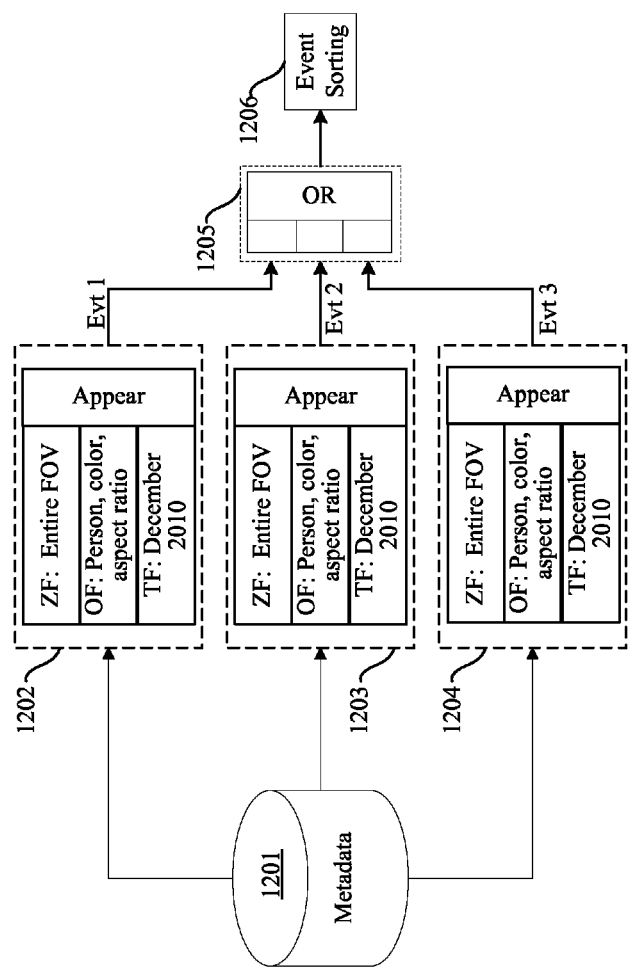
FIG. 12 is an inference engine representation for searching an event across three cameras according to some embodiments.

FIG. 12 presents another example. In this example, all persons who appeared in the scenes of cameras 1, 2 and 3 in December 2010 and looked like a monitored person (in term of color appearance and aspect ratio) are found. Then the frames or scenes are sorted by people in decreasing order of the similarity. In this example, video metadata is processed by the inference engine, and the metadata is retrieved from metadata storage 1201. An appear behavior detector is used to process objects from each of the three cameras (retrieved from metadata storage server 1201). Behavior detector 1202 processes data from camera 1, behavior detector 1203 processes data from camera 2, and behavior detector 1204 processes data from camera 3. For each behavior detector, its zone filter (ZF) is set to entire FOV (or zone 0); the object filter's (OF) color features and aspect ratio features are set accordingly. This can be done by referring to the counterpart of the monitored person. Each time filter (TF) is set to December 2010. The outputs of the three behavior detectors are combined by an "OR" logic operator 1205 to obtain a combined event outputted to activator 1206 of event sorting. In event sorting 1206, a sorting measure is specified for features color and aspect ratio, and its reference values directly take those from the monitored person (a known object). The resultant events are sorted in a real-time way. Whenever a new event is created, it is inserted into a proper location (obtained by binary search) of the previously sorted event list based on the similarity value that is computed using the best match object of an event and the monitored object.

In some embodiments, many other events could be easily detected. For example, a vehicle collision may be detected as an "AND" combination of a "Merge" behavior event (two vehicles collide together) and a "Dwelling Object" behavior event (the two vehicles stay together and keeps static after collision) that take place sequentially within a preset time range. For another example, a car leaving parking event may be detected as an "AND" combination of a "Leave Zone" behavior event (the car leaves its parking location) and a "Cross Line" event (then the car leaves the parking lot from an exit) that take place sequentially within a preset time range. Various other behavior detectors can be used to detect various events.

Other examples of configuration (including implementations) are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

As used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C). A wireless communication network does not have all communications transmitted wirelessly, but is configured to have at least some communications transmitted wirelessly.

Further, more than one invention may be disclosed.

What is claimed is:

1. A video method comprising:
  receiving an indication from a user specifying a first video source and a second video source, wherein the first video source specifies first video data associated with a first camera of interest and wherein the second video source specifies second video data associated with a second camera of interest;
  receiving an indication from the user specifying a first behavior to determine within the first video data;
  receiving an indication from the user specifying a second behavior to determine within the second video data;
  receiving an indication from the user specifying an amount of time;
  receiving an indication from the user specifying a logical combination of the first behavior, the second behavior, and the amount of time;
  receiving an indication from the user specifying an action;
  receiving the first and second video data associated with the first and second cameras of interest;
  analyzing the first video data to attempt to determine an occurrence of the first behavior and the second video data to attempt to determine an occurrence of the second behavior; and
  undertaking the action after, and in response to, determining that the logical combination of the first behavior, the second behavior, and the amount of time occurred.

2. The video method of claim 1, wherein the first or second behavior comprises a behavior associated with an image of an object found within the video data.

3. The video method of claim 2, wherein the first behavior is selected from the group of behaviors of the object consisting of: the object crosses a line within the video scene, the object loitering, the object entering a zone, the object leaving a zone, the object appearing in a zone, the object disappearing from within a zone, the object dwelling in a zone, the object becoming abandoned, the object being removed from the scene or zone, the object speeding through the video data frames, the object violating direction parameters, the object merging with another object, and an object splitting from another object.

4. The video method of claim 1, wherein the action comprises an action selected from the group consisting of logging behaviors to a file, raising an alarm, sending an electronic notification, displaying a snapshot of event incidents, replaying a video clip of event incidents, extracting statistics, sorting events, and switching between cameras on a display.

5. The video method of claim 1 further comprising:
  receiving an indication from the user specifying a first zone within a first camera field of view of the first camera of interest or a second zone within a second camera field of view of the second camera of interest within which to search for the first or second behavior, respectively; and
  analyzing the first or second video data for the specified first or second behavior within the specified first or second zone.

6. The video method of claim 5 wherein the specified first or second zone includes a region of interest bounded by a polygon.

7. The video method of claim 5 wherein the specified first or second zone includes one or more line segments.

8. The video method of claim 1 further comprising:
  receiving an indication from the user specifying an object type; and
  analyzing the first or second video data for the specified first or second behavior occurring in association with the specified object type.

9. The video method of claim 1, wherein the first or second video data include metadata.

10. The video method of claim 1 wherein the first and second behaviors include a plurality of behaviors associated with positions of an object, the method further comprising receiving, from the user, an indication of a logical combination of the plurality of behaviors, wherein the analyzing is performed to determine whether the logical combination of the plurality of behaviors is detected.

11. The video method of claim 1, wherein a first field of view of the first camera of interest is not overlapping with a second field of view of the second camera of interest.

12. The video method of claim 11, wherein the amount of time is an expected travel time from the first field of view of the first camera of interest to the second field of view of the second camera of interest.

13. The video method of claim 1, wherein the action is undertaken in response to determining that the first behavior occurred, at a time of occurrence, in the first video data and determining that the second behavior did not occur in the second video data within the amount of time relative to the time of occurrence of the first behavior.

14. An inference engine comprising:
  a video input configured to input video data;
  a user interface; and
  a processor communicatively coupled to the video input and the user interface, wherein the processor is configured to:
    receive an indication from a user through the user interface specifying a first video source and a second video source, wherein the first video source specifies first video data associated with a first camera of interest and wherein the second video source specifies second video data associated with a second camera of interest;
    receive an indication from the user through the user interface specifying a first behavior to detect within the first video data;
    receive an indication from the user through the user interface specifying a second behavior to detect within the second video data;
    receive an indication from the user through the user interface specifying an amount of time;
    receive an indication from the user specifying a logical combination of the first behavior, the second behavior, and the amount of time;
    receive an indication from the user through the user interface specifying an action;

receive the first and second video data associated with the first and second cameras of interest through the video input;

analyze the first video data to attempt to determine an occurrence of the first behavior and the second video data to attempt to determine an occurrence of the second behavior; and undertake the action after, and in response to, determining that the logical combination of the first behavior, the second behavior, and the amount of time occurred.

15. The inference engine according to claim 14, wherein the first or second behavior comprises an event associated with an object identified within the video data.

16. A non-transitory computer readable medium comprising code executable by a processor, the code causing the processor to:

receive an indication from a user through a user interface specifying a first video source and a second video source, wherein the first video source specifies first video data associated with a first camera of interest and wherein a second video source specifies second video data associated with a second camera of interest;

receive an indication from the user through the user interface specifying a first behavior to detect within the first video data;

receive an indication from the user through the user interface specifying a second behavior to detect within the second video data;

receive an indication from the user through the user interface specifying an amount of time;

receive an indication from the user specifying a logical combination of the first behavior, the second behavior, and the amount of time;

receive an indication from the user through the user interface specifying an action;

receive the first and second video data associated with the first and second camera of interest, respectively, through a video input;

analyze the first video data to attempt to determine an occurrence of the first behavior and the second video data to attempt to determine an occurrence of the second behavior; and undertake the action after, and in response to, determining that the logical combination of the first behavior, the second behavior, and the amount of time occurred.

* * * * *